(12) United States Patent
Kawasaki

(10) Patent No.: US 9,900,459 B2
(45) Date of Patent: Feb. 20, 2018

(54) IMAGE READING DEVICE

(71) Applicant: KYOCERA Document Solutions Inc., Osaka (JP)

(72) Inventor: Kenichiro Kawasaki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/107,703

(22) PCT Filed: Jan. 19, 2015

(86) PCT No.: PCT/JP2015/051165
§ 371 (c)(1),
(2) Date: Jun. 23, 2016

(87) PCT Pub. No.: WO2015/115216
PCT Pub. Date: Aug. 6, 2015

(65) Prior Publication Data
US 2016/0323475 A1    Nov. 3, 2016

(30) Foreign Application Priority Data

Jan. 31, 2014  (JP) .................................. 2014-018043
Jan. 31, 2014  (JP) .................................. 2014-018053
Jan. 31, 2014  (JP) .................................. 2014-018059

(51) Int. Cl.
*H04N 1/047*   (2006.01)
*H04N 1/401*   (2006.01)
(Continued)

(52) U.S. Cl.
CPC ......... *H04N 1/0473* (2013.01); *H04N 1/0057* (2013.01); *H04N 1/00798* (2013.01);
(Continued)

(58) Field of Classification Search
None
See application file for complete search history.

(56) References Cited

U.S. PATENT DOCUMENTS

2004/0169895 A1    9/2004  Hashizume et al.
2007/0076274 A1    4/2007  Higashitani
(Continued)

FOREIGN PATENT DOCUMENTS

JP    2004-343190    12/2004
JP    2006-33386     2/2006
(Continued)

OTHER PUBLICATIONS

Translation for JP 2004-343190.*
(Continued)

*Primary Examiner* — Huo Long Chen
*Assistant Examiner* — Lennin Rodriguezgonzalez
(74) *Attorney, Agent, or Firm* — Wenderoth, Lind & Ponack, L.L.P.

(57) ABSTRACT

When heights from the reading lines (Lr, Lg, Lb) on the transmission part (13B) corresponding to the line sensors ($33r$, $33g$, $33b$) to the predetermined conveyance path T are employed as reading heights of the line sensors ($33r$, $33g$, $33b$), a position shift correction unit (100) performs first correction control for correcting position shifts between image signals outputted from the line sensors ($33r$, $33g$, $33b$) on the basis of a difference of the reading heights between the line sensors ($33r$, $33g$, $33b$).

7 Claims, 9 Drawing Sheets

| | | | -130 mm | ... | ... | -20 mm | -10 mm | 0 mm | 10 mm | 20 mm | ... | ... | 130 mm |
|---|---|---|---|---|---|---|---|---|---|---|---|---|---|
| Position shift correction coefficient of red (R) for green (G) | Fixed reading $\Delta Hrg=0$ | | $a_{-130}$ | ... | ... | $a_{-20}$ | $a_{-10}$ | $a_0$ | $a_{10}$ | $a_{20}$ | ... | ... | $a_{130}$ |
| | Flow reading $\Delta Hrg>0$ | | $a_{-130} \times \alpha$ | ... | ... | $a_{-20} \times \alpha$ | $a_{-10} \times \alpha$ | $a_0 \times \alpha$ | $a_{10} \times \alpha$ | $a_{20} \times \alpha$ | ... | ... | $a_{130} \times \alpha$ |

| | | | -130 mm | ... | ... | -20 mm | -10 mm | 0 mm | 10 mm | 20 mm | ... | ... | 130 mm |
|---|---|---|---|---|---|---|---|---|---|---|---|---|---|
| Position shift correction coefficient of blue (B) for green (G) | Fixed reading $\Delta Hbg=0$ | | $b_{-130}$ | ... | ... | $b_{-20}$ | $b_{-10}$ | $b_0$ | $b_{10}$ | $b_{20}$ | ... | ... | $b_{130}$ |
| | Flow reading $\Delta Hbg>0$ | | $a_{-130} \times \beta$ | ... | ... | $a_{-20} \times \beta$ | $a_{-10} \times \beta$ | $a_0 \times \beta$ | $a_{10} \times \beta$ | $a_{20} \times \beta$ | ... | ... | $a_{130} \times \beta$ |

(51) Int. Cl.
*H04N 1/00* (2006.01)
*H04N 1/03* (2006.01)
*H04N 1/10* (2006.01)

(52) U.S. Cl.
CPC ............. *H04N 1/03* (2013.01); *H04N 1/1061* (2013.01); *H04N 1/401* (2013.01); *H04N 2201/0094* (2013.01)

(56) References Cited

U.S. PATENT DOCUMENTS

| | | |
|---|---|---|
| 2008/0037077 A1 | 2/2008 | Higashi et al. |
| 2010/0134858 A1 | 6/2010 | Minamino et al. |
| 2012/0320437 A1 | 12/2012 | Kanaya |

FOREIGN PATENT DOCUMENTS

| | | |
|---|---|---|
| JP | 2008-48043 | 2/2008 |
| JP | 2009-177389 | 8/2009 |
| JP | 2013-5190 | 1/2013 |

OTHER PUBLICATIONS

International Search Report dated Mar. 3, 2015 in corresponding International Application No. PCT/JP2015/051165.
Extended European Search Report dated Jun. 6, 2017 in corresponding European Application No. 15743484.6.

\* cited by examiner

Fig.4A

Image center
Sub-scanning direction

| Position shift correction coefficient of red (R) for green (G) | | Correction coefficient | | | | | | | | | |
|---|---|---|---|---|---|---|---|---|---|---|---|
| | | −130 mm | ... | ... | −20 mm | −10 mm | 0 mm | 10 mm | 20 mm | ... | ... | 130 mm |
| | Fixed reading hg=0 | $a_{-130}$ | ... | ... | $a_{-20}$ | $a_{-10}$ | $a_0$ | $a_{10}$ | $a_{20}$ | ... | ... | $a_{130}$ |
| | hg>0 | $a_{-130} \times A$ | ... | ... | $a_{-20} \times A$ | $a_{-10} \times A$ | $a_0 \times A$ | $a_{10} \times A$ | $a_{20} \times A$ | ... | ... | $a_{130} \times A$ |

Fig.4B

Image center
Sub-scanning direction

| Position shift correction coefficient of blue (B) for green (G) | | Correction coefficient | | | | | | | | | |
|---|---|---|---|---|---|---|---|---|---|---|---|
| | | −130 mm | ... | ... | −20 mm | −10 mm | 0 mm | 10 mm | 20 mm | ... | ... | 130 mm |
| | 固定読取 hg=0 | $b_{-130}$ | ... | ... | $b_{-20}$ | $b_{-10}$ | $b_0$ | $b_{10}$ | $b_{20}$ | ... | ... | $b_{130}$ |
| | hg>0 | $b_{-130} \times B$ | ... | ... | $b_{-20} \times B$ | $b_{-10} \times B$ | $b_0 \times B$ | $b_{10} \times B$ | $b_{20} \times B$ | ... | ... | $b_{130} \times B$ |

Fig.5A

| Position shift correction coefficient of red (R) for green (G) | | Correction coefficient — Sub-scanning direction (Image center) | | | | | | | | | |
|---|---|---|---|---|---|---|---|---|---|---|---|
| | | −130 mm | ... | ... | −20 mm | −10 mm | 0 mm | 10 mm | 20 mm | ... | 130 mm |
| | Fixed reading $\Delta Hrg=0$ | $a_{-130}$ | ... | ... | $a_{-20}$ | $a_{-10}$ | $a_0$ | $a_{10}$ | $a_{20}$ | ... | $a_{130}$ |
| | Flow reading $\Delta Hrg>0$ | $a_{-130} \times \alpha$ | ... | ... | $a_{-20} \times \alpha$ | $a_{-10} \times \alpha$ | $a_0 \times \alpha$ | $a_{10} \times \alpha$ | $a_{20} \times \alpha$ | ... | $a_{130} \times \alpha$ |

Fig.5B

| Position shift correction coefficient of blue (B) for green (G) | | Correction coefficient — Sub-scanning direction (Image center) | | | | | | | | | |
|---|---|---|---|---|---|---|---|---|---|---|---|
| | | −130 mm | ... | ... | −20 mm | −10 mm | 0 mm | 10 mm | 20 mm | ... | 130 mm |
| | Fixed reading $\Delta Hbg=0$ | $b_{-130}$ | ... | ... | $b_{-20}$ | $b_{-10}$ | $b_0$ | $b_{10}$ | $b_{20}$ | ... | $b_{130}$ |
| | Flow reading $\Delta Hbg>0$ | $a_{-130} \times \beta$ | ... | ... | $a_{-20} \times \beta$ | $a_{-10} \times \beta$ | $a_0 \times \beta$ | $a_{10} \times \beta$ | $a_{20} \times \beta$ | ... | $a_{130} \times \beta$ |

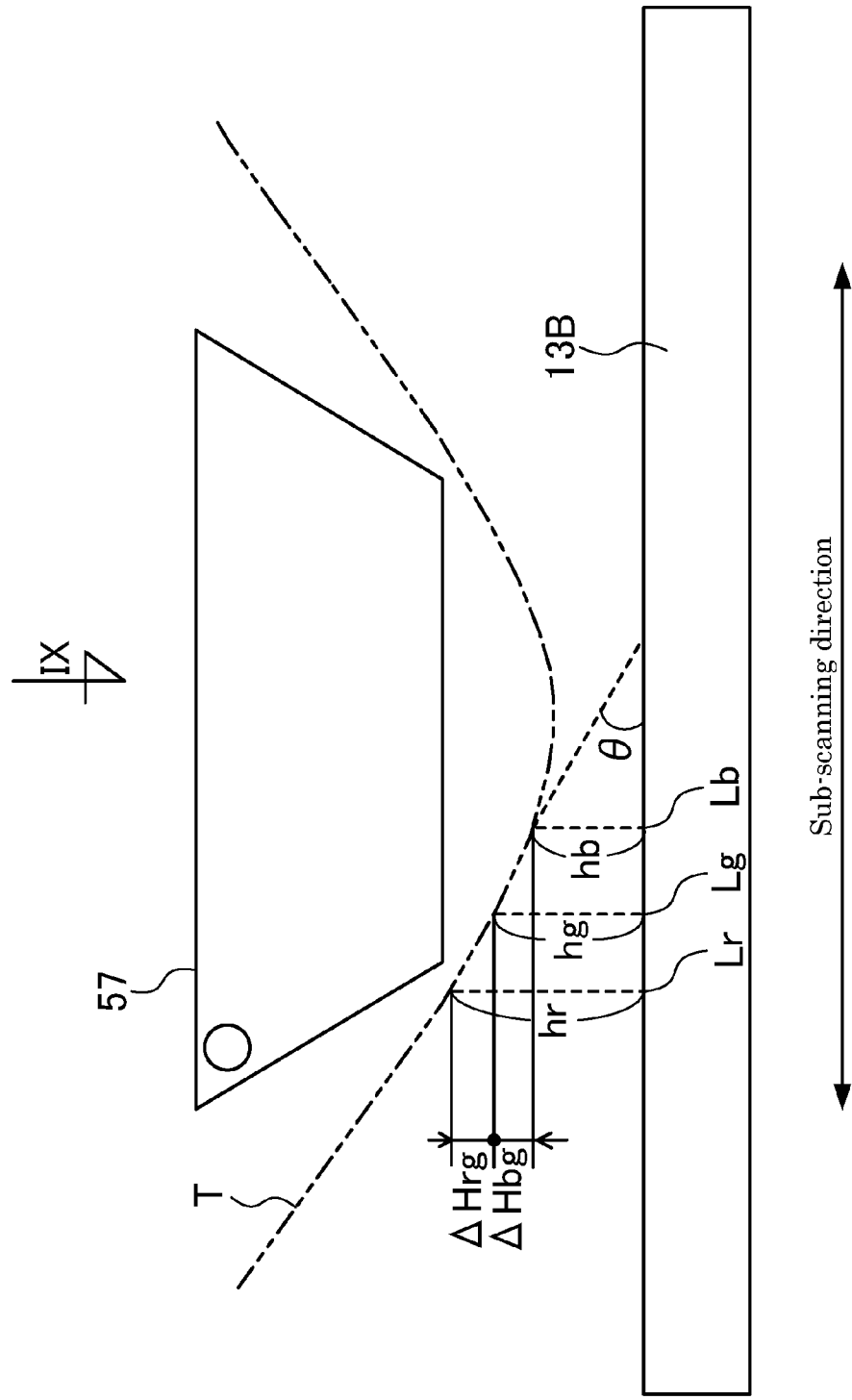

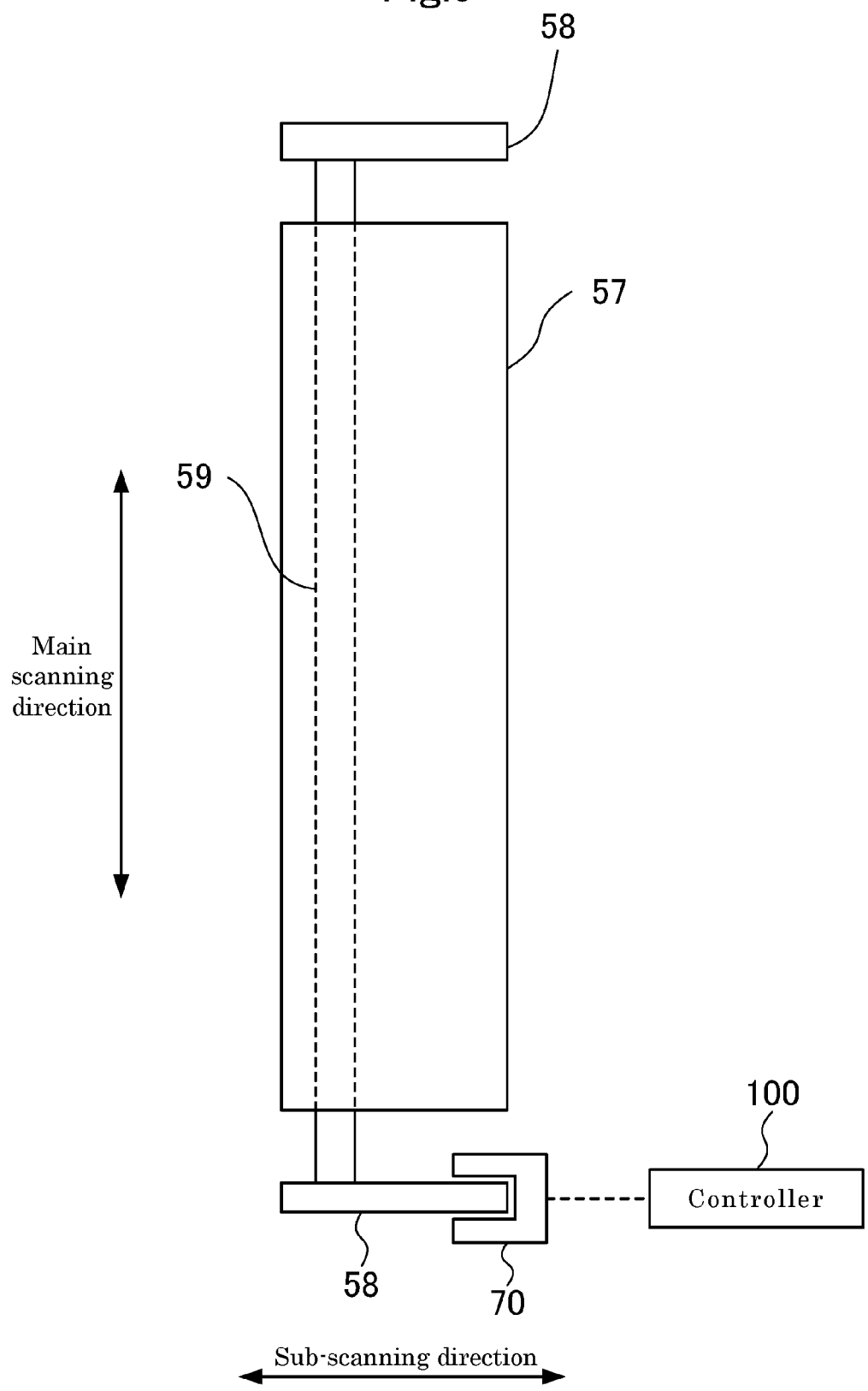

IMAGE READING DEVICE

TECHNICAL FIELD

The present invention relates to an image reading device.

BACKGROUND ART

Conventionally, there is known an image reading device including a plurality of line sensors that read light of color components different from one another. The image reading device has a platen glass and a light source that irradiates light to a document. In the platen glass, a plurality of reading lines corresponding to the plurality of line sensors have been set. The plurality of reading lines extend in a main scanning direction and are arranged spaced apart from one another in a sub-scanning direction. On an optical path between the platen glass and the plurality of line sensors, an image forming lens is arranged. Light reflected in the aforementioned document passes through the plurality of reading lines on the platen glass and is led to each line sensor through the image forming lens. Each line sensor converts the received light into an image signal for output. Between the image signals outputted from each line sensor, a position shift occurs due to chromatic aberration of the image forming lens. Therefore, a technology of correcting the image signals outputted from each line sensor on the basis of predetermined correction coefficients has been proposed.

In recent years, with the increased demands for speeding up, an image reading device capable of performing a flow reading operation in addition to a fixed reading operation in which a document is fixed to a platen glass and is read, is spreading. In these two reading operations, since document reading states are different from each other, it has been proposed to independently set the aforementioned correction coefficients in each reading operation (for example, see Patent Literature 1).

CITATION LIST

Patent Literature

Patent Literature 1: Japanese Laid-open Patent Publication No. 2006-33386

SUMMARY OF INVENTION

Technical Problem

However, when a document is read while being fed, the document, for example, is bent in an arc shape along a conveyance path. Therefore, heights (hereinafter, referred to as reading heights) from each reading line corresponding to each line sensor to the document are different from one another. As a consequence, there is a problem that a position shift between the image signals outputted from each line sensor occurs due to a difference of the reading heights (a difference of optical path lengths).

In the technology disclosed in Patent Literature 1, correction coefficients are independently set to each of the fixed reading operation and the flow reading operation, but there is no consideration for the bending of a document occurring in the flow reading operation. Thus, is it is difficult to solve the aforementioned problem by simply employing the technology disclosed in Patent Literature 1.

The present invention is achieved in view of such points above. Accordingly, an object of the present invention is to prevent a position shift between image signals outputted from each line sensor from occurring due to a difference of reading heights of each line sensor in a flow reading operation of a document.

Solution to Problem

According to the present invention, there is provided an image reading device including a plurality of reading lines set on a transmission part and arranged spaced apart from one another in a sub-scanning direction while extending in a main scanning direction, a document feeding device for conveying a document along a predetermined conveyance path such that the document passes through upper sides of the plurality of reading lines, a light source for irradiating light to the document, an image forming lens for forming an image of reflected light having passed through each reading line after being reflected in the document, a plurality of line sensors provided corresponding to the plurality of reading lines and receiving reflected light of color component different from one another to output as image signals, and a position shift correction unit for correcting position shifts between the image signals outputted from the plurality of line sensors.

Furthermore, when heights from each reading line on the transmission part corresponding to each line sensor to the predetermined conveyance path are employed as reading heights of each line sensor, the position shift correction unit is configured to perform first correction control for correcting the position shifts between the image signals outputted from each line sensor on a basis of a difference of the reading heights of each line sensor.

According to this, in the flow reading operation of a document, even though there is a difference in the reading heights of each line sensor, it is possible to reliably suppress a position shift between image signals outputted from the line sensors.

Advantageous Effects of Invention

According to the present invention, it is possible to suppress a position shift between image signals outputted from each line sensor from occurring due to a difference in reading heights of each line sensor in the flow reading operation of a document.

BRIEF DESCRIPTION OF DRAWINGS

FIG. 4A is a table illustrating reference height correction data, and illustrates data for correcting a position shift of a red (R) for a green (G).

FIG. 4B is a table illustrating reference height correction data, and illustrates data for correcting a position shift of a blue (B) for a green (G).

FIG. 5A is a table illustrating height shift correction data, and illustrates data for correcting a position shift of a red (R) for a green (G).

FIG. 5B is a table illustrating height shift correction data, and illustrates data for correcting a position shift of a blue (B) for a green (G).

FIG. 7 is a diagram illustrating an embodiment 3, which corresponds to FIG. 2.

FIG. 9 is a view viewed in the arrow direction IX of FIG. 7.

DESCRIPTION OF EMBODIMENTS

<<Embodiment 1>>

Figure 1:
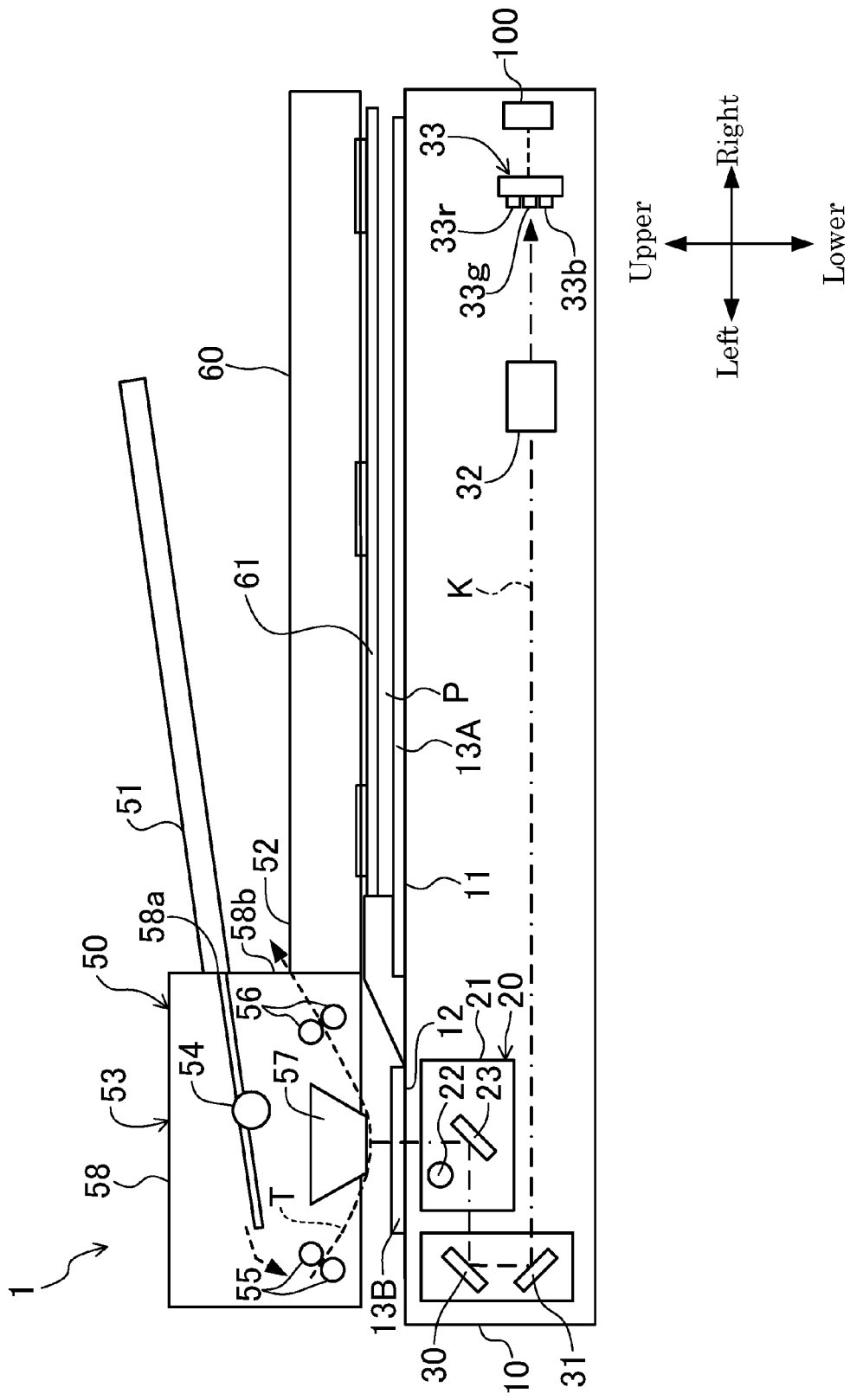
FIG. 1 is a schematic longitudinal section view when viewed from the front side, which illustrates a digital scanner as an image reading device in an embodiment.

FIG. 1 illustrates a digital scanner 1 (hereinafter, simply referred to as a scanner 1) as an image reading device in an embodiment. The scanner 1 optically reads a document image and generates digital image data thereof. The scanner 1, for example, is mounted in a copy machine or a multi-functional peripheral (MFP). In the following description, a left side and a right side indicate a left side and a right side of FIG. 1 and a front side and a rear side indicate a front side and a back side in a direction vertical to the paper surface of FIG. 1.

The scanner 1 includes a casing 10, a reading unit 20, reflective mirrors 30 and 31, an image forming lens 32, a CCD sensor 33, a document feeding device (ADF) 50, and a controller 100.

The casing 10 is formed at an upper wall portion thereof with a first opening 11 and a second opening 12. The second opening 12 is formed at a left end portion in the upper wall portion of the casing 10. The second opening 12 has a rectangular shape long in a front and rear direction in a plan view. The first opening 11 is formed at a right side from the second opening 12. An opening area of the first opening 11 is larger than that of the second opening 12. The first opening 11 is closed by a first platen glass 13A. The first platen glass 13A is used in a fixed reading operation. The fixed reading operation is an operation in which a document placed on the first platen glass 13A is read by the reading unit 20. The second opening 12 is closed by a second platen glass 13B. The second platen glass 13B is used in a flow reading operation. The flow reading operation is an operation in which a document P is read by the reading unit 20 while being conveyed by the document feeding device 50. It is noted that in the following description, the first platen glass 13A and the second platen glass 13B are simply called a platen glass 13 when it is not necessary to particularly distinguish them from each other.

The reading unit 20 has a carriage 21, an LED light source 22, and a reflective mirror 23. The LED light source 22 and the reflective mirror 23 have been fixed to the carriage 21 and been unitized. The carriage 21 is configured to be movable in a sub-scanning direction (a right and left direction) by a driving mechanism 40 using a driving motor such as a stepping motor. The driving motor is controlled by the controller 100.

The LED light source 22 includes a plurality of white LEDs arranged in a main scanning direction (a front and rear direction). The LED light source 22 irradiates white light, which corresponds to one line in the main scanning direction, toward the aforementioned document P via the platen glass 13. The reflective mirror 23 is arranged at a right oblique lower side of the light source 22. The light emitted from the LED light source 22 is reflected in the document, passes through the platen glass 13, and then is led to the reflective mirror 23. In the platen glass 13, a line, through which the reflected light passes, is called a reading line. In the present embodiment, in each platen glass 13, three reading lines of a red reading line Lr, a green reading line Lg, and a blue reading line Lb have been set (see FIG. 2). The reading lines Lr, Lg, and Lb respectively correspond to line sensors 33r, 33g, and 33b which will be described later. When the reading unit 20 has moved in the sub-scanning direction, each of the reading lines Lr, Lg, and Lb moves in the sub-scanning direction according to the movement.

The reflected light reflected in the reflective mirror 23 is reflected in sequence of the reflective mirror 30 and the reflective mirror 31 arranged at the left side from the reading unit 20, and then is led to the CCD sensor 33 through the image forming lens 32. The image forming lens 32 has a function of forming an image of the reflected light. The CCD sensor 33 is arranged at an image forming position of the reflected light by the image forming lens 32.

The CCD sensor 33 has a red line sensor 33r, a green line sensor 33g, and a blue line sensor 33b. Each of the line sensors 33r, 33g, and 33b is configured by a plurality of photoelectric conversion elements arranged in the main scanning direction. Each of the line sensors 33r, 33g, and 33b has a filter for causing only a color component corresponding to itself to pass therethrough. That is, the red line sensor 33r causes only a red component of light to pass therethrough, the blue line sensor 33b causes only a blue component of light to pass therethrough, and the green line sensor 33g causes only a green component of light to pass therethrough. Each of the line sensors 33r, 33g, and 33b performs photoelectric conversion with respect to light received by each photoelectric conversion element, and outputs an image signal of a document image. The image signal outputted from each of the line sensors 33r, 33g, and 33b is inputted to the controller 100. Details of the controller 100 will be described later.

The document feeding device 50 is a device for automatically conveying the document P at the time of the flow reading operation. The document feeding device 50 has been fixed to a document cover 60. A rear end edge of the document cover 60 is supported to the rear end edge of the casing 10 so as to be swingable via a hinge member. The document cover 60 is configured to swing around the hinge member, thereby covering an upper surface of the casing 10 so as to be openable and closable. In the fixed reading operation, it is sufficient if a user opens the document cover 60, places the document P on the first platen glass 13A, and then closes the document cover 60, thereby fixing the document P onto the first platen glass 13A. In the flow reading operation, it is sufficient if the document P is set to the document feeding device 50 in the state in which the document cover 60 has been closed.

The document feeding device 50 has a document setting part 51, a document discharge part 52, and a document conveying part 53. The document conveying part 53 is received in a rectangular parallelepiped shaped case 58 extending in the front and rear direction. The case 58 is formed at a right side surface thereof with a paper feeding port 58a. The document setting part 51 includes a tray connected to the paper feeding port 58a. At a lower side of the paper feeding port 58a in the right side surface of the case 58, a paper discharge port 58b is formed. At a right side of the paper discharge port 58b, the document discharge part 52 is provided. The document discharge part 52 is formed by an upper surface of the document cover 60.

The document discharge part 52 has a feeding roller 54, a paper feeding roller pair 55, and a paper discharge roller pair 56. By the feeding roller 54 and both roller pairs 55 and 56, a document conveyance path T is formed. The document conveyance path T has an arc shape in which a lower side is convex when viewed from the main scanning direction. Between the paper feeding roller pair 55 and the paper discharge roller pair 56, a document guide part 57 is arranged. The document guide part 57 has a trapezoidal shape in which a width becomes narrow as it goes to the lower side when viewed from the main scanning direction. The document guide part 57 guides an upper surface of the document P such that the document P is conveyed along the document conveyance path T.

Next, the reading operations of the document P will be described. In the fixed reading operation, the reading unit 20 moves a lower side of the first platen glass 13A from the left side to the right side. In this way, by the CCD sensor 33, an image signal of an entire document image is generated.

In the flow reading operation, the reading unit 20 stops at a lower side of the second platen glass 13B without moving in the right and left direction. Instead, the document P is conveyed by the document feeding device 50, so that the document P moves an upper side of the second platen glass 13B. In this way, by the CCD sensor 33, an image signal of an entire document image is generated. The image signal generated by the CCD sensor 33 is transmitted to the controller 100.

Figure 3:
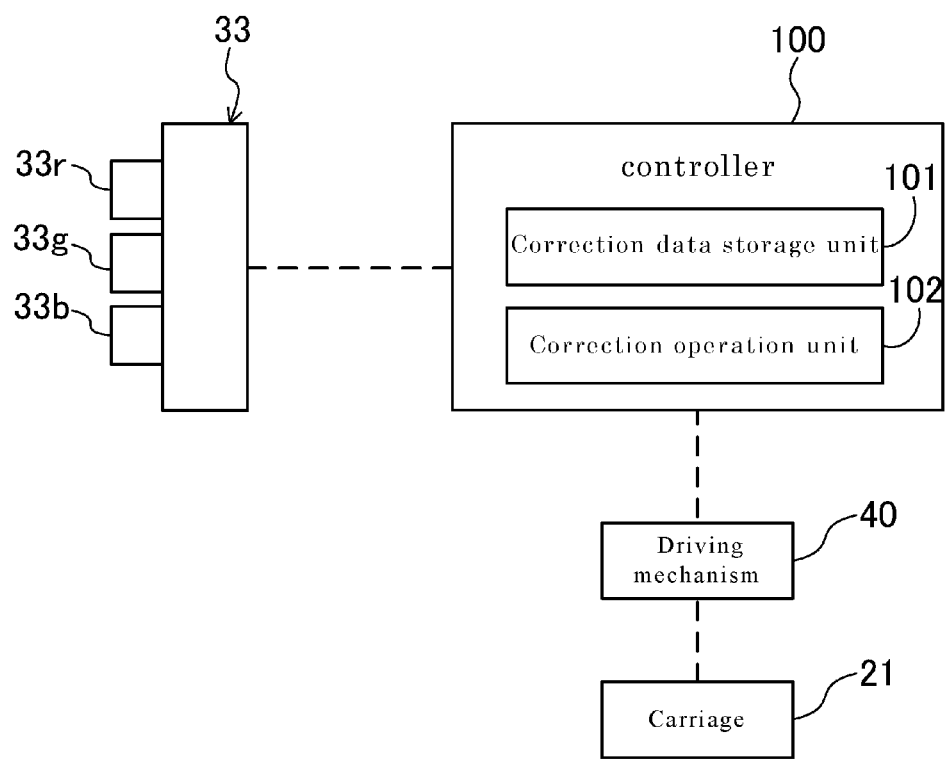
FIG. 3 is a block diagram illustrating a configuration of a controller.

The controller 100 (see FIG. 3), for example, is configured by a microcomputer having CPU, ROM, and RAM. The controller 100 has a correction data storage unit 101 and a correction operation unit 102. The correction data storage unit 101 stores three types of data of chromatic aberration correction data, reference height correction data, and height shift correction data. Based on the correction data, the correction operation unit 102 corrects position shifts between image signals outputted by the line sensors 33r, 33g, and 33b. In the present embodiment, the correction operation unit 102 employs the image signal outputted from the green line sensor 33g as a reference and corrects position shifts between the image signals outputted from the red line sensor 33r and the blue line sensor 33b.

With reference to FIG. 4A, FIG. 4B, FIG. 5A, and FIG. 5B, the aforementioned each correction data will be described. The chromatic aberration correction data is data for correcting position shifts between image signals occurring by the chromatic aberration of the image forming lens 32 when the document P has been placed on (fixed to) the first platen glass 13A. In FIG. 4 and FIG. 5, correction coefficients "$a_{-130}, \ldots a_{-20}, a_{-10}, a_0, a_{10}, a_{20}, \ldots a_{130}$" and "$b_{-130}, \ldots b_{-20}, b_{-10}, b_0, b_{10}, b_{20}, \ldots b_{130}$" of the first stage among correction coefficients illustrated in two stages are the chromatic aberration correction data. Herein, the "a" indicates a position shift correction coefficient of a red for a green and the "b" indicates a position shift correction coefficient of a blue for a green. The subscript indicates a position in the sub-scanning direction. Since the chromatic aberration of the image forming lens 32 is generally large as it goes to the outer side in the sub-scanning direction, the correction coefficient has also been set to be large as it goes to the outer side in the sub-scanning direction. As the correction coefficient is large, it indicates that a correction amount of a position shift is also large.

The reference height correction data is data for correcting position shifts between image signals due to an increase in a document reading height of the green line sensor 33g, which is a correction reference, in the flow reading operation as compared with the fixed reading operation. Herein, the reading height is a distance of a vertical direction from the reading lines Lr, Lg, and Lb to the conveyance path T. In the present embodiment, correction is performed on the basis of the reading height hg of the green line sensor 33g, which is a correction reference.

In the reference height correction data, a position shift correction coefficient of a red for a green has been set as a value obtained by multiplying the correction coefficient a of the chromatic aberration correction data by A (see FIG. 4A). The A has been set to be large as the reading height hg of the green line sensor 33g, which is a correction reference, is large. In the reference height correction data, a position shift correction coefficient of a blue for a green has been set as a value obtained by multiplying the correction coefficient b of the chromatic aberration correction data by B (see FIG. 4B). The B has been set to be large as the reading height hg of the green line sensor 33g, which is a correction reference, is large.

Figure 2:
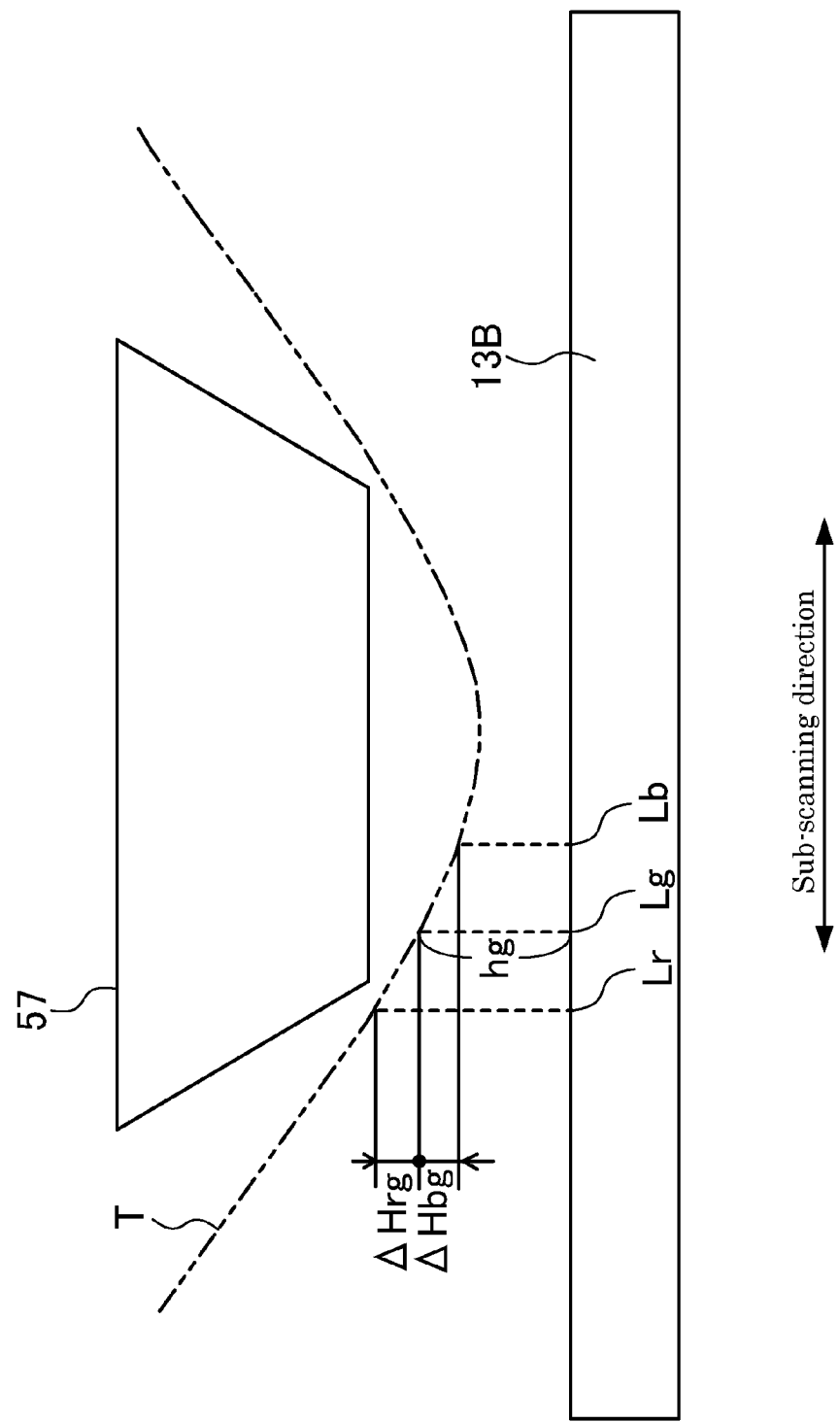
FIG. 2 is an explanation example for explaining three reading lines on a platen glass and reading heights corresponding to each reading line.

The height shift correction data is data for correcting position shifts between image signals due to a difference between reading heights of the blue line sensor 33b and the red line sensor 33r with respect to the reading height hg of the green line sensor 33g, which is a correction reference, in the flow reading operation. In FIG. 2, ΔHrg indicates a difference between the reading heights of the red line sensor 33r and the green line sensor 33g, and ΔHbg indicates a difference between the reading heights of the blue line sensor 33b and the green line sensor 33g. In the height shift correction data, the position shift correction coefficient of a red for a green has been set as a value obtained by multiplying the correction coefficient a of the chromatic aberration correction data by α (see FIG. 5A). The α has been set to be large as the height shift ΔHrg is large. In the height shift correction data, a position shift correction coefficient of a blue for a green has been set as a value obtained by multiplying the correction coefficient b of the chromatic aberration correction data by β (see FIG. 5B). The β has been set to be large as the height shift ΔHbg is large.

Consequently, as with the example of FIG. 2, when hg>0, ΔHrg>0, and ΔHbg>0, the position shift correction coefficient of a red for a green is a×A×α, and the position shift correction coefficient of a blue for a green is b×A×β.

As described above, the controller 100 corrects position shifts between image signals on the basis of the height shift correction data. That is, the controller 100 is configured to perform control (hereinafter, referred to as first correction control) for correcting position shifts between image signals, which are outputted from the line sensors 33r, 33g, and 33b, on the basis of the differences ΔHrg and ΔHbg of the reading heights of the line sensors 33r, 33g, and 33b, which occur at the time of the flow reading operation of the document P. In this way, it is possible to reliably suppress position shifts between image signals. Accordingly, it is possible to improve the quality of a document image obtained by the flow reading operation. Furthermore, it is possible to suppress a difference of the quality of a document image in the fixed reading operation and the flow reading operation.

<<Embodiment 2>>

Figure 6:
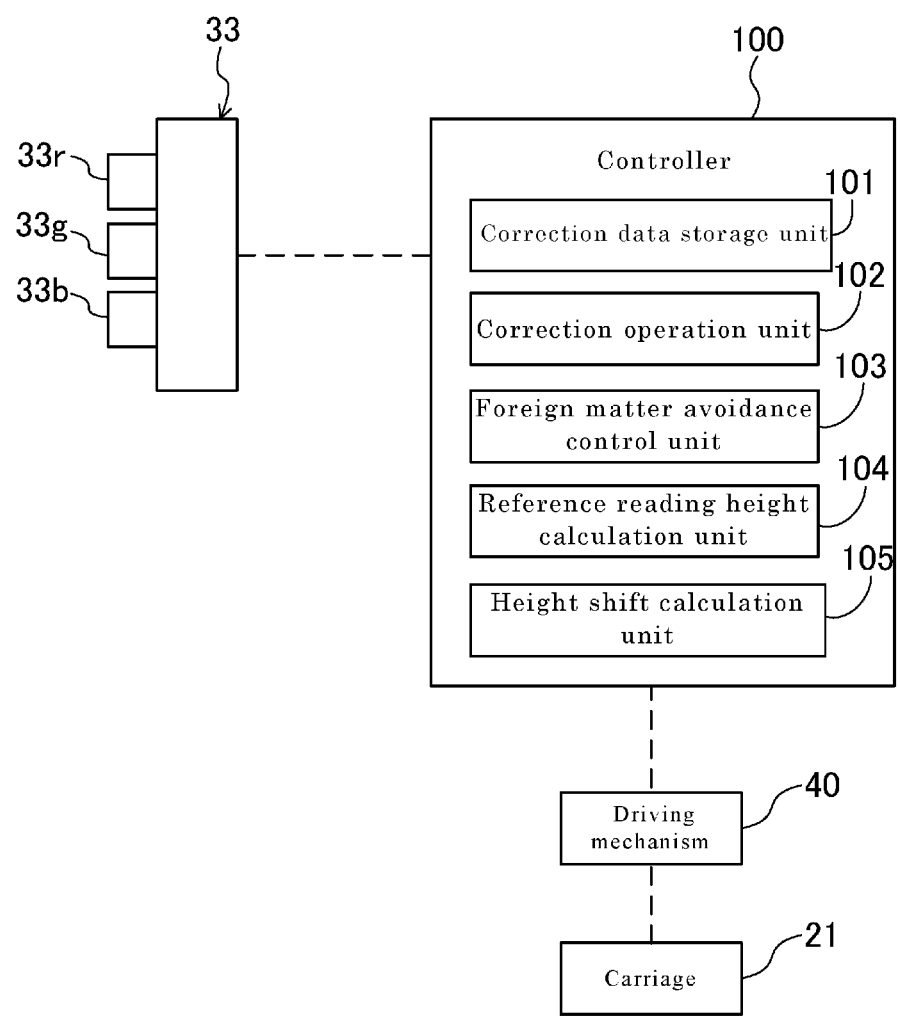
FIG. 6 is a diagram illustrating an embodiment 2, which corresponds to FIG. 3.

FIG. 6 illustrates an embodiment 2. The present embodiment is different from the embodiment 1 in that the controller 100 further has a foreign matter avoidance control unit 103, a reference reading height calculation unit 104, and a height shift calculation unit 105. The same reference numerals are used to designate the same control elements as those of FIG. 3, and a detailed description thereof will be omitted.

That is, when there has been a start request of the flow reading operation, the foreign matter avoidance control unit 103 firstly determines whether a foreign matter has been placed on at least one of the three reading lines Lr, Lg, and Lb before starting the flow reading operation. This determination, for example, is performed on the basis of whether a part, in which a luminance value becomes less than a threshold value, exists in image signals outputted from each of the line sensors 33r, 33g, and 33b. When it is determined that the foreign matter has been placed, the foreign matter avoidance control unit 103 moves the reading unit 20 in the sub-scanning direction by a predetermined amount. The foreign matter avoidance control unit 103 repeats the avoidance operation until no foreign matter exists on the reading lines Lr, Lg, and Lb.

In the digital scanner 1 that performs the foreign matter avoidance control as described above, the aforementioned reading heights hg and height shifts ΔHrg and ΔHbg also change by the position of the reading unit 20 in the sub-scanning direction. The reference reading height calculation unit 104 calculates the reading heights hg on the basis of the shape and the position of the document conveyance path T stored in advance and the position of the green reading line Lg (the reference line) in the sub-scanning direction. It is sufficient if the position of the green reading line Lg in the sub-scanning direction is detected based on a rotation angle of the driving motor that drives the reading unit 20.

The height shift calculation unit 105 calculates the height shifts ΔHrg and ΔHbg based on the shape and the position of the document conveyance path T stored in advance and the positions of the reading lines Lr, Lg, and Lb in the sub-scanning direction. The positions of the reading lines Lr, Lg, and Lb in the sub-scanning direction are calculated (detected) based on, for example, the rotation angle of the driving motor that drives the reading unit 20 and a distance among optical axes of the line sensors 33r, 33g, and 33b.

The correction operation unit 102 increases the magnification A and the magnification B multiplied to the correction coefficient a and the correction coefficient b as the reading height hg calculated by the reference reading height calculation unit 104 is large, thereby correcting position shifts between image signals.

The correction operation unit 102 increases the magnification α and the magnification β multiplied to the correction coefficient a and the correction coefficient b as the height shifts ΔHrg and ΔHbg calculated by the height shift calculation unit 105 is large, thereby correcting position shifts between image signals.

As described above, in the embodiment 2, the controller 100 performs the first correction control similarly to the embodiment 1. Consequently, it is possible to obtain operation effects similar to those of the embodiment 1.

Moreover, in the embodiment 2, the controller 100 is configured to perform control (second correction control) for correcting position shifts between image signals outputted from the line sensors 33r, 33g, and 33b on the basis of the reading height hg calculated by the reference reading height calculation unit 104, in addition to the first correction control. Consequently, in consideration of a change in the reading height of the green line sensor 33g serving as a reference as well as the differences ΔHrg and ΔHbg of the reading heights of the line sensors 33r, 33g, and 33b, it is possible to correct position shifts between image signals.

Furthermore, in the embodiment 2, the foreign matter avoidance control unit 103 of the controller 100 performs foreign matter avoidance control, thereby preventing a black stripe from occurring in a read image. Furthermore, even though a reading line has moved by the execution of the foreign matter avoidance control, the reading height hg of the green line sensor 33g serving as a reference is automatically calculated by the reference reading height calculation unit 104 and the height differences ΔHrg and Hbg are automatically calculated by the height shift calculation unit 105, and in the correction operation unit 102, the height shifts of the line sensors 33r, 33g, and 33b are automatically calculated on the basis of the calculated values. Consequently, even when the reading heights of the line sensors 33r, 33g, and 33b are changed by the foreign matter avoidance operation of the reading unit 20 as with the embodiment 2, it is possible to accurately correct position shifts between image signals outputted from the line sensors 33r, 33g, and 33b.

Furthermore, in the aforementioned embodiment, the document conveyance path T of the document P by the document feeding device 50 has an arc shape in which a lower side is convex when viewed from the main scanning direction.

As described above, the document conveyance path T of the document P is bent, so that the conveyance of the document P by the document feeding device 50 is facilitated. In this case, as compared with the case in which the document P is conveyed in a flat state, the height differences ΔHrg and ΔHbg from the reading lines Lr, Lg, and Lb to the document P become large. The position shift correction by the correction operation unit 102 is particularly useful for such a configuration.

<<Embodiment 3>>

FIG. 7 illustrates an embodiment 3. The embodiment 3 is different from the embodiment 1 in that the document guide part 57 is rotatable around a shaft 59. The same reference numerals are used to designate the same elements as those of the embodiment 1, and a detailed description thereof will be omitted.

Figure 8A:
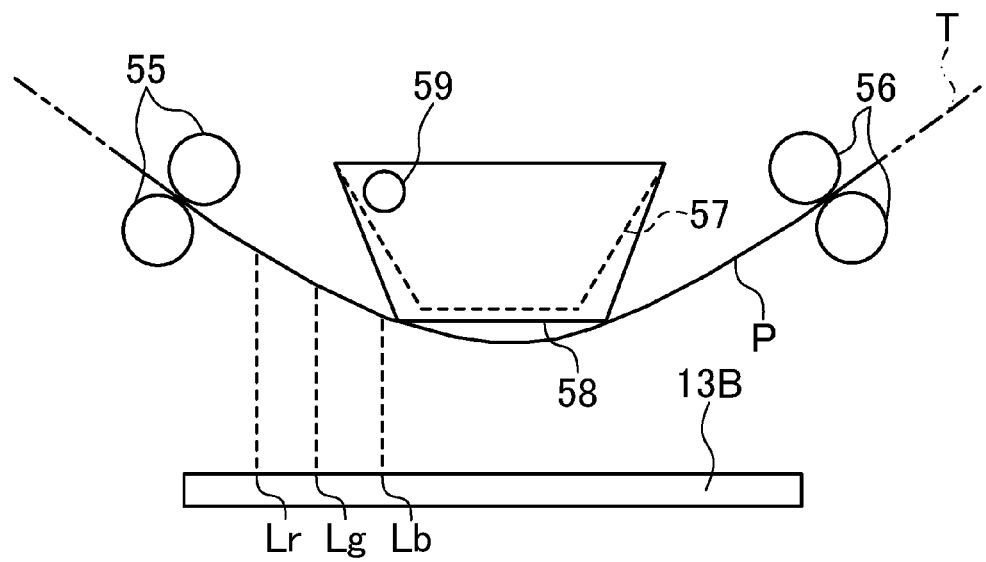
FIG. 8A is an explanation example for explaining a rotation operation of a document conveyance angle detection member, and illustrates a state at the time of the start of document conveyance.
Figure 8B:
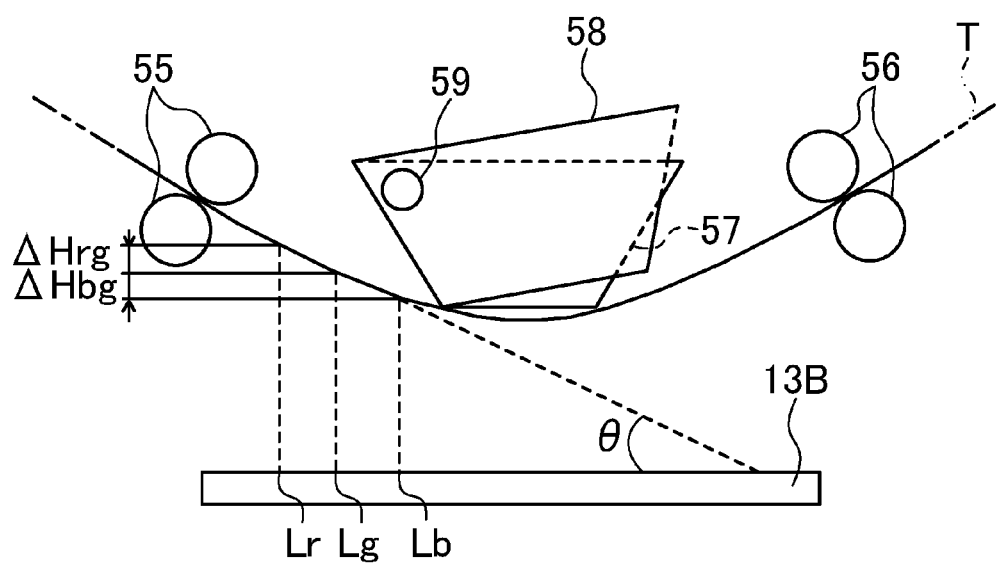
FIG. 8B is an explanation example for explaining a rotation operation of a document conveyance angle detection member, and illustrates a state after the start of document conveyance.

That is, in the present embodiment, document conveyance angle detection members 58 are provided at both sides of the document guide part (corresponding to a document restraint part) 57 in the main scanning direction (see FIG. 8A, FIG. 8B, and FIG. 9). The document conveyance angle detection members 58 have a trapezoidal shape. The document conveyance angle detection members 58 are supported to the document guide part 57 via the shaft 59 so as to be swingable. The shaft 59 is fixed to the case 58. The shaft 59 passes through the document guide part 57 in the main scanning direction. Furthermore, the document conveyance angle detection members 58 are supported to at both end portions of the shaft 59. A rotation angle of the document conveyance angle detection member 58 is detected by a rotation angle detection sensor 70. The rotation angle detection sensor 70 is connected to the controller 100. The rotation angle detection sensor 70, for example, includes a transmissive photo interrupter having a light receiving element and a light emitting element. The document conveyance angle detection member 58 is formed with a plurality of slit holes (not illustrated) for angle detection by the photo interrupter. The rotation angle detection sensor 70 detects the rotation angle of the document conveyance angle detection member 58 and transmits information on the detected rotation angle to the controller 100. It is noted that the rotation angle detection sensor 70, for example, may be a reflection type photo interrupter. In this case, it is sufficient if a plurality of slit grooves are provided instead of the slit holes of the document conveyance angle detection member 58.

In the flow reading operation, at the time of the start of the conveyance of the document P by the document feeding device 50, the document conveyance angle detection member 58 abuts an upper surface of the document P to guide the document P (see FIG. 8A). After the conveyance of the document P is started by the document feeding device 50, tension applied to the document P increases, so that the document P is gradually stretched (see FIG. 8B). When the document P is stretched, the document conveyance angle detection member 58 is pressed to an upper side by the document P and rotates around the shaft 59. The rotation angle of the document conveyance angle detection member 58 is detected by the rotation angle detection sensor 70 and is transmitted to the controller 100.

The controller 100 (see FIG. 3) has the correction data storage unit 101 and the correction operation unit 102 similarly to the embodiment 1. The correction data storage unit 101 stores three types of data of chromatic aberration correction data, reference height correction data, and height shift correction data. Since the content of these types of correction data is similar to that of the embodiment 1, a description thereof will be omitted.

Based on the correction data, the correction operation unit 102 corrects position shifts between image signals outputted by the line sensors 33r, 33g, and 33b. In the present embodiment, the correction operation unit 102 employs the image signal outputted from the green line sensor 33r as a reference and corrects position shifts between the image signals outputted from the red line sensor 33r and the blue line sensor 33b. In detail, based on the rotation angle of the document conveyance angle detection member 58 received by the rotation angle detection sensor 70, the correction operation unit 102 firstly calculates a document conveyance angle θ (see FIG. 8B) which is an inclination angle of the document P with respect to the second platen glass 13B. This calculation is performed using table data (not illustrated) stored in the ROM in advance. The table data is data obtained by collecting a relation between the rotation angle of the document conveyance angle detection member 58 and the document conveyance angle θ, and for example, is obtained by performing a conveyance test. As the rotation angle of the document conveyance angle detection member 58 is small, the document conveyance angle θ is large.

Based on the calculated document conveyance angle θ and position information of the reading lines Lr, Lg, and Lb on the platen glass 13B, which have been stored in the ROM in advance and correspond to the line sensors 33r, 33g, and 33b, the aforementioned correction operation unit 102 calculates height differences from the reading lines Lr, Lg, and Lb to the document P. In detail, the correction operation unit 102 calculates the difference ΔHrg between the height hg serving as a reference from the green reading line Lg to the document P and the height hr from the red reading line Lr to the document P, and the difference ΔHbg between the height hg serving as the reference and the height hb from the blue reading line Lb to the document P. Based on the height differences ΔHrg and ΔHbg, the correction operation unit 102 corrects position shifts between image signals outputted from the line sensors 33r, 33g, and 33b.

In the embodiment 3, similarly to the embodiment 1, the controller 100 is configured to correct position shifts between image signals outputted from the line sensors 33r, 33g, and 33b on the basis of the reading height differences ΔHrg and ΔHbg of the line sensors 33r, 33g, and 33b occurring at the time of the flow reading operation of the document P. Consequently, it is possible to reliably suppress position shifts between image signals. Accordingly, it is possible to improve the image quality of a document image obtained by the flow reading operation. Furthermore, it is possible to suppress a difference of the image quality of a document image in the fixed reading operation and the flow reading operation.

Furthermore, the controller 100 is configured to calculate the conveyance angle θ of the document P based on the rotation angle of the document conveyance angle detection member 58, and calculate the height differences ΔHrg and ΔHbg from the reading lines Lr, Lg, and Lb to the document P based on the calculated conveyance angle θ of the document P and the positions of the reading lines Lr, Lg, and Lb stored in the ROM in advance.

Consequently, even though a variation has occurred in the height differences ΔHrg and ΔHbg due to a tension state of the document P, it is possible to accurately calculate the height differences by the controller 100. Accordingly, it is possible to improve the accuracy of correction of position shifts between the image signals by the controller 100.

<<Other Embodiments>>

The present invention may also have following configurations with respect to the aforementioned each embodiment.

That is, in the aforementioned each embodiment, the example, in which the number of line sensors is 3, has been described; however, the present invention is not limited thereto and for example, the number of line sensors may also be 2 or may also be equal to or more than 3.

In the aforementioned each embodiment, position shift correction of image signals of a red and a blue is performed using an image signal of a green as a reference; however, the present invention is not limited thereto and for example, an image signal of a blue may also be used as a reference or an image signal of a red may also be used as a reference.

It is noted that the present invention also includes an arbitrary combination of the aforementioned each embodiment.

INDUSTRIAL APPLICABILITY

As described above, the present invention is useful for an image reading device and particularly, is useful for an image reading device including a document feeding device.

The invention claimed is:
1. An image reading device comprising:
a plurality of reading lines set on a transmission part and arranged spaced apart from one another in a sub-scanning direction while extending in a main scanning direction;
a document feeding device for conveying a document along a predetermined conveyance path such that the document passes through upper sides of the plurality of reading lines;
a light source for irradiating light to the document;
an image forming lens for forming an image of reflected light having passed through each reading line after being reflected in the document;
a plurality of line sensors provided corresponding to the plurality of reading lines and receiving reflected light of color component different from one another to output image signals; and
a controller for correcting position shifts between the image signals outputted from the plurality of line sensors, wherein, when heights from the reading lines on the transmission part corresponding to the line sensors to the predetermined conveyance path are employed as reading heights of the line sensors, the controller is configured to perform first correction control for correcting the position shifts between the image signals outputted from the line sensors on a basis of a difference of the reading heights of the line sensors, and the controller is configured to perform:

a position detection control that detects a position in the sub-scanning direction of a reference reading line set in advance among the plurality of reading lines;

a reference reading height calculation control that calculates a reading height of a line sensor corresponding to the reference reading line based on the position of the reference reading line detected by the position detection control and a shape and a position of the predetermined conveyance path; and second correction control for correcting the position shifts between the image signals outputted from the line sensors on a basis of the reading height calculated by the reference reading height calculation control, in addition to the first correction control.

2. The image reading device according to claim 1, wherein the image reading device further includes:

a carriage mounted with the light source and a reflective mirror that leads the reflected light having passed through each reading line after being reflected in the document; and a driving mechanism that moves the plurality of reading lines in the sub-scanning direction by driving the carriage in the sub-scanning direction, wherein the controller is configured to execute a height shift calculation control that calculates the difference of the reading heights of the line sensors on a basis of positions of the plurality of reading lines in the sub-scanning direction and a shape and a position of the conveyance path, and the first correction control by the controller is control for correcting the position shifts between the image signals outputted from the line sensors on a basis of a difference of the reading heights of the line sensors, which has been calculated by the height shift calculation control.

3. The image reading device according to claim 2, wherein the image reading device is configured such that the controller is configured to perform a foreign matter avoidance control unit that, when it is determined whether a foreign matter has been placed on at least one of the plurality of reading lines and it is determined that the foreign matter has been placed on the reading line, performs foreign matter avoidance control for avoiding the foreign matter from being placed on the reading line by moving the reading line in the sub-scanning direction by the driving mechanism.

4. The image reading device according to claim 1, wherein the conveyance path has an arc shape in which a lower side is convex when viewed from the main scanning direction.

5. The image reading device according to claim 1, wherein the conveyance path has an arc shape in which a lower side is convex when viewed from the main scanning direction.

6. An image reading device comprising:

a plurality of reading lines set on a transmission part and arranged spaced apart from one another in a sub-scanning direction while extending in a main scanning direction;

a document feeding device for conveying a document along a predetermined conveyance path such that the document passes through upper sides of the plurality of reading lines;

a light source for irradiating light to the document;

an image forming lens for forming an image of reflected light having passed through each reading line after being reflected in the document;

a plurality of line sensors provided corresponding to the plurality of reading lines and receiving reflected light of color component different from one another to output image signals; and a controller for correcting position shifts between the image signals outputted from the plurality of line sensors, wherein, when heights from the reading lines on the transmission part corresponding to the line sensors to the predetermined conveyance path are employed as reading heights of the line sensors, the controller is configured to perform first correction control for correcting the position shifts between the image signals outputted from the line sensors on a basis of a difference of the reading heights of the line sensors, and the image reading device further comprises:

a document conveyance angle detection member provided so as to abut an upper surface of the document at a time of start of conveyance of the document by the document feeding device;

a support shaft extending in the main scanning direction and supporting the document conveyance angle detection member so as to be swingwable; and an angle detection sensor that detects a rotation angle of the document conveyance angle detection member around the support shaft, wherein the document conveyance angle detection member is configured to be pressed upward by the document and to rotate upward around the support shaft when the conveyance of the document is started by the document feeding device, and the first correction control by the controller is control for calculating a conveyance angle of the document based on a rotation angle of the document conveyance angle detection member, calculating the difference of the reading heights of the line sensors based on the calculated conveyance angle of the document and positions of the reading lines on the transmission part corresponding to the line sensors, and correcting the position shifts between the image signals outputted from the line sensors on a basis of the calculated difference of the reading heights.

7. The image reading device according to claim 6, wherein the conveyance path of the document by the document feeding device has an arc shape in which a lower side is convex when viewed from the main scanning direction.

* * * * *